(12) United States Patent
Bobbio (10) Patent No.: US 7,891,145 B1
(45) Date of Patent: Feb. 22, 2011

(54) SPOOL-MOUNTED COILED STRUCTURAL EXTENDING MEMBER

(75) Inventor: Stephen M. Bobbio, 209 Oakcrest Dr., Wake Forest, NC (US) 27587

(73) Assignee: Stephen M. Bobbio, Wake Forest, NC (US)

( * ) Notice: Subject to any disclaimer, the term of this patent is extended or adjusted under 35 U.S.C. 154(b) by 300 days.

(21) Appl. No.: 11/968,235

(22) Filed: Jan. 2, 2008

Related U.S. Application Data

(60) Provisional application No. 60/883,209, filed on Jan. 3, 2007.

(51) Int. Cl.
*E04H 12/18* (2006.01)
*B65H 75/34* (2006.01)

(52) U.S. Cl. ............... 52/108; 242/379.2; 242/390.2; 242/397.5; 242/594

(58) Field of Classification Search ............... 52/108; 242/379, 379.2, 388.6, 390.2, 397, 397.5, 242/400, 594, 594.1, 594.2, 595, 595.1
See application file for complete search history.

(56) References Cited

U.S. PATENT DOCUMENTS

| | | | | |
|---|---|---|---|---|
| 1,729,955 | A | * 10/1929 | Matthaei | 242/595.1 |
| 1,947,392 | A | * 2/1934 | Guntermann et al. | 52/108 |
| 3,242,576 | A | 3/1966 | Wheeler | |
| 3,443,316 | A | * 5/1969 | Edgell | 242/379 |
| 3,508,587 | A | 4/1970 | Mauch | |
| 4,275,503 | A | 6/1981 | Bergkvist | |
| 4,387,875 | A | 6/1983 | Ohori | |
| 4,625,475 | A | 12/1986 | McGinnis | |
| 5,056,278 | A | 10/1991 | Atsukawa | |
| 5,063,686 | A | 11/1991 | Peloquin | |
| 5,718,087 | A | * 2/1998 | Featherstone et al. | 52/108 |

* cited by examiner

*Primary Examiner*—Richard E Chilcot, Jr.
*Assistant Examiner*—Matthew J Smith (57) ABSTRACT

A very lightweight long-range extending member formed from assembled tapes. The strength of an extended structure can be greatly increased by forming a composite structure from individual single tapes. This invention describes various composite structures and the means for forming them.

18 Claims, 4 Drawing Sheets

Plan View

Fig. 7A

Perspective View

Fig. 7B

Plan View

Fig. 8A

Perspective View

Fig. 8B

SPOOL-MOUNTED COILED STRUCTURAL EXTENDING MEMBER

This application claims benefit of priority to U.S. provisional application No. 60/883,209 filed on 3, Jan. 2007, which is incorporated herein by reference.

BACKGROUND

In many circumstances it would be useful to form a relatively long rigid member from a compact source at one end. For example a robotic arm that can transfer parts through vacuum doors in a multiple chamber vacuum system has proven important in the design of the cluster tools used in the integrated circuit manufacturing industry. In the past such devices have usually used lead screws, pneumatic or hydraulic cylinders, or pantograph type mechanisms to effect their operation. Robotic extension arms are also useful additions to autonomous or remotely controlled robots in a wide range of applications from those used in planetary exploration to those involved in munitions detection and passivation.

Structural extending members comprising three flexible tapes have been described in U.S. Pat. Nos. 4,625,475; 3,242,576; and 5,056,278, all of which are incorporated herein by reference. In U.S. Pat. No. 3,242,576, Wheeler describes a rigid, extendable measurement device in which three flexible metal tapes are held together at their edges by means of hook-and-loop material to form a rigid structure with a triangular cross section. In U.S. Pat. No. 4,625,475, McGinnis describes an extensible mast, which is erected from a portable base. The mast comprises a plurality of tapes reinforced with a wrap material. In U.S. Pat. No. 5,056,278, Atsukawa describes an extensible support pole in which telescoping cylindrical bodies are extended and retracted by means of band-like plates. The band-like plates are held in place within the cylindrical bodies by partition members having guide slits or guide holes to accommodate the band-like plates. None of these disclosures describe retaining rings that are carried on an extendable structure comprising a plurality of tapes.

SUMMARY OF INVENTION

This invention discloses a very lightweight extremely long-range extending member formed from assembled tapes. Metal measuring tapes are an example. They are widely available in a range of lengths (25 ft typical) and widths (1 inch typical). These tapes are wound about a spring-loaded spindle that allows for easy retraction. The cross section of the tapes is curved to lend some rigidity during extension. This rigidity is not uniform. Forces that act toward the convex side of the curve easily kink the tape although the tape is much more resistant to forces acting toward the concave side. A typical tape with its concave side facing upwards can be extended horizontally about seven feet before it collapses under its own weight. A tape with its convex side facing up collapses for much less extension. For widths greater than those available with measuring tapes, spring steel is readily available in much larger sizes though it is usually flat. The methods and structures described herein also apply to larger tapes as well as to those with flat cross sections.

The strength of an extended structure can be greatly increased by forming a composite structure from individual single tapes. This invention describes various composite structures and the means for forming them.

DETAILED DESCRIPTION OF THE PREFERRED EMBODIMENTS

Figure 1A:
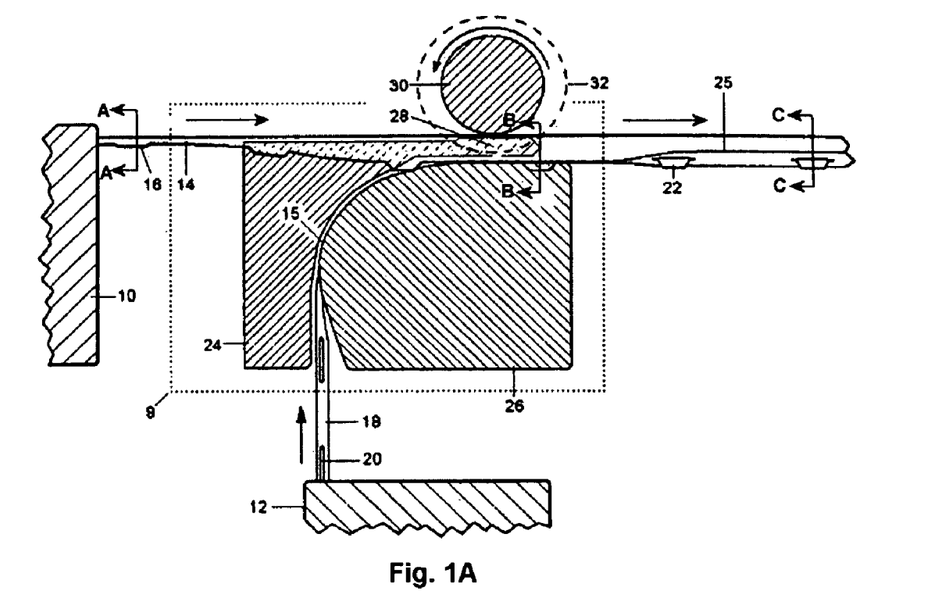
FIG. 1A shows a two-tape embodiment of a composite structure according to the present invention and a mechanism for forming the structure.
Figure 1B:
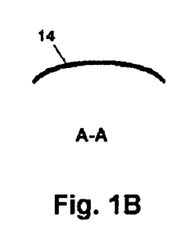
FIG. 1B, FIG. 1C, and FIG. 1D are views of the tape cross section at sections indicated in FIG. 1A.

FIG. 1A shows a first embodiment of the invention. Metal tapes, 14 and 18, are wound on spring-loaded spools in the structures 10 and 12. Details of these spooling structures are not given since they are identical to metal measuring tape devices that are widely available. Both metal tapes, 14 and 18, have curved cross sections, again identical to metal measuring tapes. This curvature is shown in FIG. 1B and indicated in at the cross section labeled A-A in FIG. 1A. Unlike measuring tapes, the metal tapes in FIG. 1A are patterned. In the case of the tape 14 the pattern consists of small projections or tabs along either edge of the tape. These tabs are indicated by 16 and 22 in FIG. 1A. Tab 16 is shown on tape 14 in its unattached state while tab 22 is shown on tape 14 after it has become a part of the two-tape composite structure, 25, that is formed from the combination of tapes 14 and 18. In the case of tape 18 the pattern consists of slots, 20, located along the length of tape 18 at intervals that match the locations of the tabs on tape 14. The tapes, 14 and 18, are impelled out of the spooling structures, 10 and 12, in the direction shown by the arrows in FIG. 1A.

Figure 1C:
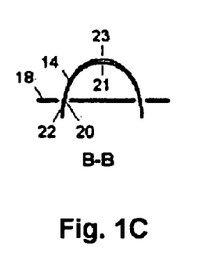

Both tapes are impelled to the guiding/forming structures labeled 24 and 26. As tape 18 enters the curved narrow channel, 15, between the guiding/forming structures it becomes flattened. Conversely, as tape 14 passes across the top of piece 24 its cross sectional curvature is increased. This increase in curvature is due to the combined action of the flanged roller, 30 and 32, and the terminal portion of structure 24 that is labeled 28. The cross sections of both tapes 14 and 18 in the vicinity of the roller are shown in FIG. 1C and indicated by B-B in FIG. 1A. The center part of the roller, 30, contacts the outer part of the top of tape 14; that is, at the part of tape 14 labeled 23 in section B-B. Similarly, the flange parts of the roller, 32, contact the outer part of tape 14 so as to form it around the terminal part, 28, of the guiding/forming structure, 24. The terminal part, 28, contacts tape 14 along its inner surface, 21, in section B-B. The terminal part, 28, also insures that tape 18 remains flat. The two tapes are then meshed together as shown in section B-B. The slots on tape 18 are of sufficient width that the tabs of tape 14 move into them in an unrestricted way. That is, in the vicinity of cross section B-B the slots, 20, should provide ample clearance on both sides of the tabs, 22, as shown in section B-B. In addition to forming the tapes, the flanged roller, 30 and 32, may be used to impel their motion. The motion of the roller is indicated by the counterclockwise arrow at the top of FIG. 1A. If the roller is used to impel motion, its middle part, 30, should be fabricated from a material, such as hard rubber, that can provide high friction between itself and the top of tape 14; the roller can be driven either by hand or with a suitably geared motor. Conversely, the terminal part, 28 in FIG 1A, should be surfaced with a very low friction (slippery) material such as fluorinated plastic (e.g. FEP, fluorinated ethylene propylene) so that it does not impede overall motion in the directions of the arrows.

The foregoing description uses tapes with a curved cross section as elements used to form a composite structure. Curved tapes are the elements of the preferred embodiment but they are not readily available in widths greater than 1.25 inches. Exactly the same methods may be used for flat tapes and the mechanism in FIG. 1A would equally apply. In the case of flat tapes the sectional drawings would be slightly different. In Section A-A, part 14 would be flat, Section B-B would be identical, and in Section C-C part 18 would be flat (as it is shown in Section B-B).

Figure 1D:
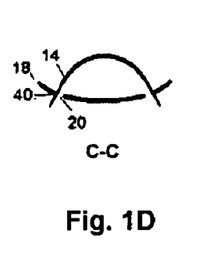

As the tapes move to the right of the roller in FIG. 1A, the external constraints on their cross sections are removed and they tend to return to their naturally curved shapes; this locks the tabs into position and forms the two-tape composite structure, 25, in FIG. 1A. The cross section of the composite is indicated by section C-C in FIG. 1A. In section C-C the spring forces acting on the cross section of the tapes have caused the tabs of tape 14 to move away from the center and seat against the outside edges of the slots, 20, in tape 18. This is shown at the point labeled 40 in section C-C.

All of the arrows in FIG. 1A are drawn to indicate the assembly of the composite structure, 25. For disassembly, the sense of all the arrows is simply reversed by, for example, driving the flanged roller, 30 and 32 in FIG. 1A, in the clockwise direction. Final take-up of the tapes, 14 and 18, is simply accomplished with the spring-loaded spooling structures, 10 and 12, that have been designed by many commercial suppliers for that purpose. If the roller is not driven, the composite structure, 25, may be pulled to the right for extension and pushed to the left for retraction; alternatively, the spooling structures, 10 and 12, may be modified so that rotation of the spools may be directly driven by some external agent. In addition to the items shown in FIG. 1A there should be other guiding devices that are simply flat plates of a low friction material located above and below the plane of the drawing. These plates restrain the tapes from moving (and losing alignment) in a direction perpendicular to this plane. The plates were omitted from the drawing for clarity and their location is indicated by the dotted line labeled 9 in FIG. 1A. The plates should be spaced apart by the maximum width of the flattened tapes (typically 1.00") plus sufficient clearance so that they prevent misalignment but do not impede the desired motion. In a preferred embodiment the additional allowance for clearance is 0.01 to 0.05 inches.

Figure 2:
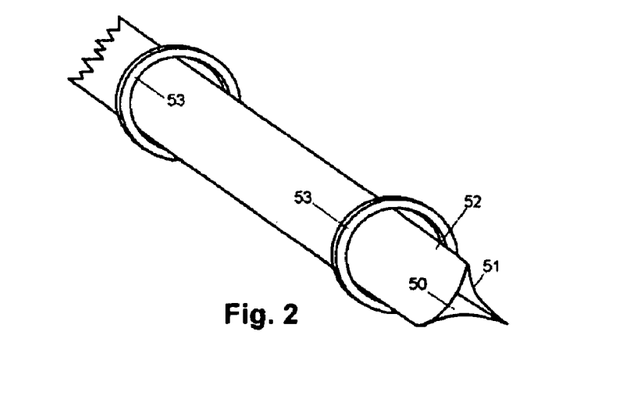
FIG. 2 is an isometric view of a three-tape structure.

FIG. 2 shows a second embodiment of the invention. In this case a three-tape composite structure has been formed from the tapes labeled 50, 51, and 52 in the figure. Three spooling structures of the type labeled 10 and 12 in FIG. 1A have been used as sources and bring the tapes together at relative angles of substantially 120 degrees to form an equilateral triangle with cusp shaped apexes. The same tab and slot joining described previously might also be adapted to form the composite. In FIG. 2, however, another joining method is depicted. The object labeled 53 is a retaining part that is slipped over the three tapes at intervals along the tape length. This is done with a mechanism (shown in subsequent figures) that is located at the position where the tapes come together. The mechanism serves to store the retaining rings in a coin-stacked way with the tapes going through the entire stack and releases them, one at a time, as the tapes move through. In FIG. 2, the retaining rings, 53, are shown as having a circular outside edge as well as a circular inside edge that fits smoothly over the apexes of the composite tape triangular cross section. By no means is the invention limited to circular forms. Any convenient shape for the outside edge may be used and any shape that fits smoothly over the cross section of the composite tape and prevents the spreading apart of the three constituent tapes (50, 51, and 52) would also work. For example a square outer edge with a straight-sided triangular hole would also be a viable design for the retaining part, 53.

Figure 3:
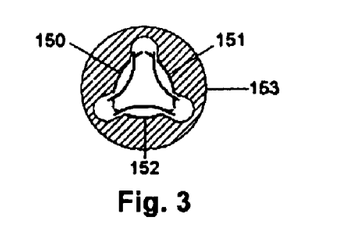
FIG. 3 is a cross section of a six-tape structure.

In order to realize additional strength in the composite extending structure a second level of assembly might be used in which structures formed from single tapes are joined together to form the final structure. FIG. 3 illustrates the cross section of one such possible final structure. Three two-tape composites (150, 151, and 152) have been assembled using the method shown in FIG. 1A. These three have then been brought together and joined with a retaining part, 153, in a way similar to the structure in FIG. 2, forming a six-tape composite. In this case, the retaining part, 153, has a circular outer edge and a three-lobed inner edge that conforms smoothly to the triangular shape (with protruding tabs) formed by 150, 151, and 152.

Figure 4:
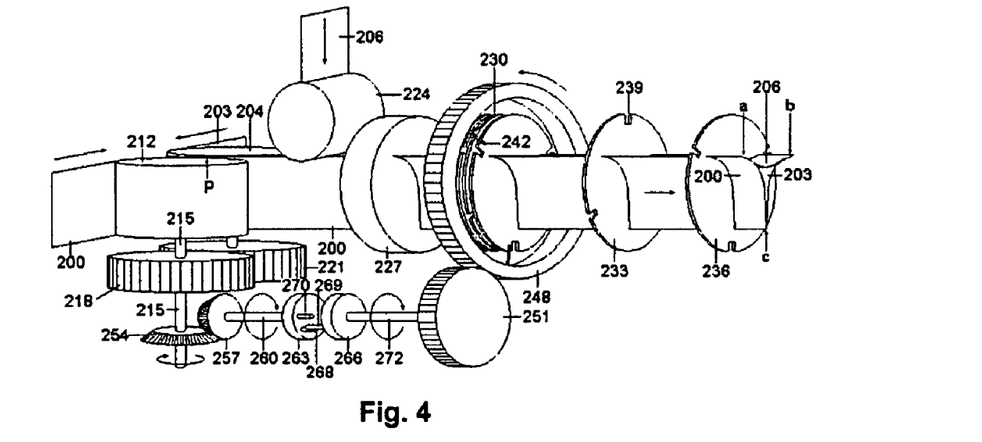
FIG. 4 shows a first mechanism for forming a three-tape structure.

FIG. 4 illustrates a mechanism for assembling, extending, retracting, and disassembling a composite structure such as the one shown in FIG. 2. The cross section of the composite structure is the cusped triangle shown at its end at the far right of the figure. At the right end of the composite the three tapes (200, 203, and 206) are joined in the vicinity of the corners labeled 'a', 'b', and 'c'. Joining may be accomplished by means of spot weldment or small screws and nuts (not shown). Motion of the three tapes (labeled 200, 203, and 206) is shown by straight arrows and motion of rotating members is shown by curved arrows. The extending condition for the composite structure is depicted. In FIG. 4, two tapes, 200 and 203, have been withdrawn from two spooling structures that are not shown in the drawing. These structures may be of the same type as are shown in FIG. 1 by the numbers 10 and 12. Withdrawal is accomplished by the action of two pinch rollers, 204 and 212. These rollers are surfaced with a high friction material (such as hard rubber or other elastomer) and bear with substantial pressure on the two tapes, 200 and 203, in the vicinity of the position labeled 'P' in the drawing. Roller 212 is provided with an axle, 215, that may be turned by some external means such as a hand crank or electric motor. The same axle, 215, also turns a gear, 218, that meshes with another gear, 221, connected by an axle to roller 204. The gears, 218 and 221, ensure that the motion of both tapes, 200 and 203, is equally driven. The third tape, 206, is not directly driven but rather by its connection with tapes 200 and 203 at the points labeled 'a', 'b', and 'c' in FIG. 4 as well as by any frictional forces that act along the extended length of the composite. The axis of tape 206 is made parallel to the axes of tapes 200 and 203 by action of a guide (a roller or a cylinder of low friction material) shown by 224 in the figure. The three tapes are driven toward the right through a forming member, 227, that juxtaposes the three tapes to form the triangular cross section of the composite. This mechanism is made of a low friction material (e.g. FEP, fluorinated ethylene propylene) and is essentially a disk with a cusped triangular hole that allows the three tapes to pass through. The tapes next pass through a stacked group of disks, 230, provided with triangular holes similar to the forming member. These disks are generally thinner than the forming member and serve as the retaining parts that maintain the shape of the cross section in the extended composite. In FIG. 4 two of the retaining part disks, 233 and 236, have been deployed along the extended composite. All of the retaining part disks are also provided with three notches substantially equally spaced on their circumferences. A typical notch is shown by 239 on disk 233. In a preferred embodiment, the retaining part disks are made of a low friction material. The stack of retaining part disks, 230, is held to the left of the extended composite by the action of three indexing pins. One of these pins is shown by 242 in FIG. 4. The indexing pins are fixed at substantially equal angular intervals on the inside diameter of a rotating ring, 248. The outside diameter of the rotating ring, 248, is provided with gear teeth that mesh with another gear, 251, as shown in the figure. The motion of the rotating ring, 248, is synchronized with that of the pinch rollers by gear 251, which is coupled to the pinch roller axle, 215, by the combined action of parts 254, 257, 260, 263, 266, 268, 269, 270, and 272 shown in FIG. 4. Parts 254 and 257 are beveled gears and together act as right angle drive from the pinch roller axle, 215. Rotation is coupled from gear 257 by axle 260 through a mechanical hysteresis device composed of parts 263, 266, 268, 269, and 270. Parts 263 and 266 are not rigidly connected by an axle but are constrained by a support structure (not shown) to rotate about the same axis. Part 263 is provided with two eccentric pins, 268 and 270, and part 266 is provided with a single eccentric pin, 269. As shown in FIG. 4 pin 268 has engaged pin 269 and clockwise rotation of 263 is transmitted to part 266 and axle 272 which drives gear 251 and the rotating ring, 248. When the sense of rotation is reversed (e.g. to retract the composite structure) part 263 rotates counterclockwise and disengages pin 268 from pin 269. After moving through some angle in the counterclockwise direction pin 270 engages pin 268 and imparts counterclockwise rotation to parts 266, 272, and 251. This results in a delayed response of the rotating ring to a change in direction of the tapes.

The synchronization of the motions of the pinch rollers and tape extension with the rotating ring are shown in FIG. 4 to be the result of purely mechanical coupling. Such synchronization could as well be accomplished electronically by using separate stepper motors to drive the rollers and the ring where the driving signals to the two motors are phased electronically and provided with appropriate delay to provide any hysteresis that is required.

In operation, during extension the pinch rollers drive the tapes to the right in FIG. 4. Their action is synchronized with the rotating ring. The indexing pins attached to the rotating ring hold the retaining parts in the stack until they encounter notches in a retaining part disk. When this occurs, the retaining part disk is released from the stack and moves to the right along with the tapes to which it is held by frictional forces. As the extension continues, the indexing pins encounter the notches on the next retaining part disk in the stack and release it to move with the tapes. Spacing between the disks on the composite tape is thus determined by the angular displacement of the notch patterns on their circumferences. The deployed retaining part disks need not be equally spaced along the length of the extended composite. In fact, in prototypes, the spacing has been relatively large (about 30 inches) at the extended end of the composite and substantially smaller (about 8 inches) near to the rotating ring where any external torque on the extended composite is much larger.

During retraction, the tapes move to the left in FIG. 4 and, in principle, the notches on the deployed retaining part disks again encounter the indexing pins and are allowed to pass to the left of the rotating ring and add to the stack. In reality, there is very little chance that this will happen reproducibly. Disks are released during extension when indexing pins move over the edges of the notches and into the open width of the notches. If the motion of the tape and that of the rotating ring were perfectly synchronized the indexing pins would encounter these same edges during retraction. In the reverse direction, however, the indexing pins do not encounter the open widths of the notches when they pass by these same edges. The mechanical delay provided by the hysteresis device is critical to the operation of this particular embodiment of the present invention but is not necessarily required in other embodiments. The amount of delay should be enough that, in the reverse direction, the indexing pins encounter the other set of edges of the notches. Then, they do pass into the open widths of the notches during retraction and the retaining part disks are reproducibly added back into the stack.

Figure 5:
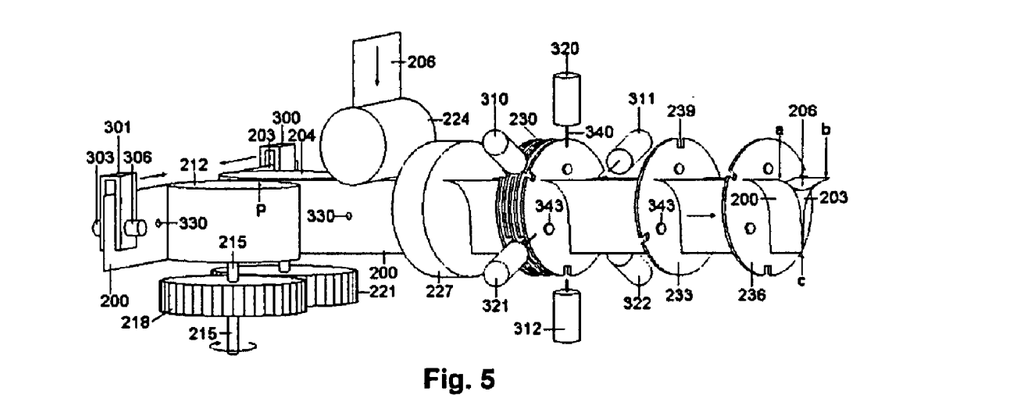
FIG. 5 shows a second mechanism for forming a three-tape structure.

FIG. 5 illustrates a second mechanism for assembling, extending, retracting, and disassembling a composite structure such as the one shown in FIG. 3. The means for moving the tapes and defining the cross section of the composite are the same as for the mechanism in FIG. 4 and corresponding parts are numbered the same as in FIG. 4. The retaining part disks (e.g. 233 and 236 in FIG. 5) are also the same except for three small protrusions, 343, on each disk. The retaining part disk stack, 230 in FIG. 5, is the same as in FIG. 4 except that the protrusions, 343, act as spacers between the disks in the stack. Two of the tapes in FIG. 5, 200 and 203, are provided with small holes, 330, at intervals along their length. These holes trigger the action of two photosensor assemblies, 300 and 301, as the tapes pass through the assemblies. FIG. 5 shows the components of one such assembly, 301. A frame part holds a light source, 303, directly across from a photodetector, 306, on the opposite side of tape 200. As a hole passes through the assembly, 301, light falls on the photodetector and triggers its action (typically a decrease in its electrical resistance). The photosensor assemblies are connected to an electronic circuit (not shown) that is used to activate the solenoids (310, 311, 312, 320, 321, and 322) that gate the motion of the retaining part disks during extension or retraction of the composite structure. The solenoids are connected in two groups of three with solenoids 310, 311, and 312 being activated by photosensor assembly 301 and solenoids 320, 321, and 322 being activated by photosensor assembly 300. When activated the solenoids withdraw control pins (e.g. 340). In FIG. 5 the group of solenoids 310, 311, and 312 are shown in the activated condition. In practice it is desirable that the electronic circuitry use the signal from the photodetectors to trigger an electronic pulse whose duration is determined by the circuitry. Monostable multivibrators are often used for this type of pulse generation and many commercial versions are readily available. Similarly available are high gain power FETS (field effect transistors) that may be driven by the monostables to provide sufficient current to drive the low impedance solenoids. In FIG. 5 the notches on the retaining part disks align with the control pins on one or the other sets of solenoids. For example the notches (e.g. 239) on disk 233 match the control pins on the set of solenoids 320, 321, and 322 while the notches on disk 236 match the control pins of solenoids 310, 311, and 312. Because there are two sets of solenoids there are also two patterns of notches on the disks; and in the stack, 230, disks having one pattern of notches are alternately placed with those having the other pattern.

As in FIG. 4 the mechanism in FIG. 5 is shown in the condition of extending the composite and straight arrows in FIG. 5 are used to indicate the motion of the tapes as well as the composite. At the far left of the drawing, a hole has just passed through photosensor assembly 301 that has triggered the circuitry to activate solenoids 310, 311, and 312 to release retaining part disk 233 from the stack 230. Held by frictional forces to the tapes, disk 233 has moved to the right along with the composite. Other disks in the stack have been prevented from moving by the action of the control pins of solenoids 320, 321, and 322, which are not activated. When the activating pulse from the monostable circuitry ceases, solenoids 310, 311, and 312 deactivate and their control pins return to their extended position. The widths of the control pins may be larger than the widths of the disks so that small spacers, 343, are placed (or fabricated) on the disks to allow the extension of the control pins to occur in an unobstructed way. As the composite continues to extend in FIG. 5 the next trigger comes from the passage of holes on tape 203 through photosensor assembly 300. This results in the control pins on solenoids 320, 321, and 322 being retracted and allows the rightmost disk in the stack to be released and move toward the right with the composite. Release of the next disk in the stack (second from the right in FIG. 5) is prevented by the extended pins of solenoids 310, 311, and 312. The two sets of solenoids continue to be alternately activated to release alternately stacked retaining part disks throughout the extension of the composite. Placement of disks on the composite is directly related to placement of holes, 300, on the tapes. Retraction of the composite and return of the disks to the stack is simply accomplished by reversing the rotation of the driving axle, 215.

Figure 6A:
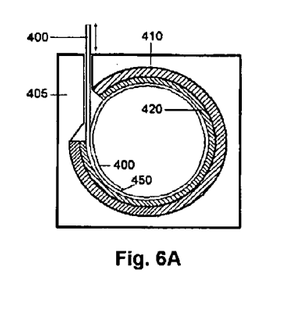
FIG. 6A shows a spooling structure that accommodates wide tapes without the use of a retracting spring in the spooling mechanism.
Figure 6B:
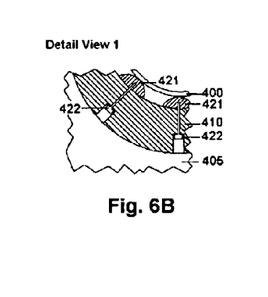
FIG. 6B and FIG. 6C are detail views of the spooling structure in FIG. 6A.
Figure 6C:
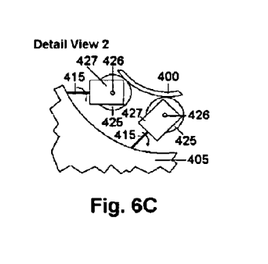

The spooling structures, 10 and 12 in FIG. 1A, represent commercially available spring loaded measuring tapes. They are readily available for tape widths up to 1.25 inches. For larger tapes, no commercial device is readily available. An alternative spooling structure that may also be used for larger tapes is shown in FIG. 6A. An overall view of the spooling structure is shown at the left of the figure. A tape, 400, may be pushed into or withdrawn from the structure in the directions indicated by the vertical arrow. The means for doing this is not shown here but might be a pinch roller tape drive such as those shown by 204 and 212 in FIGS. 4 and 5. Tape 400 enters the spooling structure support member, 405, through a slot and coils on a curved interior cavity shown circular in the figure. The support member is provided with cover plates above and below (not shown in the figure) that confine the tape in the direction perpendicular to the plane of the drawing. The outermost lap of the tape bears on a low friction layer, 420. In some cases, this layer may not be sufficient to allow smooth winding inside the cavity and after one or two turns the spooling action binds. Binding occurs because radial compression of the winding is difficult to accomplish for external forces that act along the length of the tape. To ameliorate the situation, the low friction layer, 420, is attached to a compressible layer, 410, that is attached to the walls of the inside cavity of the supporting member, 405, as shown in FIG. 6A. As the tape winds, this layer, 410, compresses allowing the low friction layer, 420, and the outer layer of the wound tape to move in the positive radial direction, that is toward the wall of the cavity and spooling action is facilitated. Detail View 1 in FIG. 6B represents a section of the spooling structure near the wall of the cavity. In FIG. 6B, the low friction layer is not continuous but rather composed of the rounded structures, 421, made of a low friction material (e.g. FEP, fluorinated ethylene propylene) and attached to the compressible layer, 410, with screw type fasteners, 422. The compressible layer itself, 410, is continuous in this example and made of a suitably compliant material such as foam rubber. Detail View 2 in FIG. 6C again represents a section of the spooling structure near the wall of the cavity. In FIG. 6C both the low friction and compressible layers are discontinuous. The low friction layer is composed of rollers, 425, that rotate on axles, 426, supported in frame pieces, 427. The frame pieces are connected to the inside wall of the cavity of the support member, 405, by flat springs, 415. The flat springs move as shown by the curved arrows in FIG. 6C to accommodate the increasing diameter of the coiled tape, 400, as it winds. The segmentation of the low friction and compressible layers is not an issue for relatively closely spaced segments. A prototype 3-inch wide tape was spooled on a 7-inch diameter circle with layers of the type shown in FIG. 6C distributed at 1.4 inch intervals around the circumference of the winding. In the case of the prototype, the support member, 405, springs, 415, and frames, 427 were not separate pieces but were cut as a single flexure unit from a sheet of plastic. The spooling mechanism shown in FIG. 6A also allows the tape to be extended or retracted without binding by forces that act in the circumferential direction upon the interior end of the tape shown as 450 in the figure.

Note that the spooling structure described above is an example of a mechanism which may be used in the practice of the present invention; other spooling mechanisms may also be used and are within the scope of the present invention as claimed.

Figure 7A:
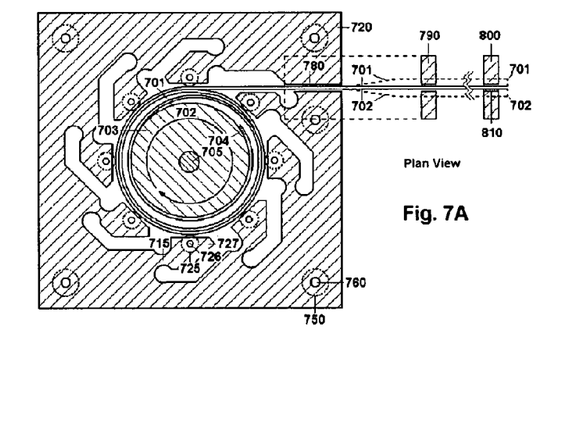
FIG. 7A shows a plan view of a two-tape embodiment of a composite structure according to the present invention using a single directly driven spooling structure.
Figure 7B:
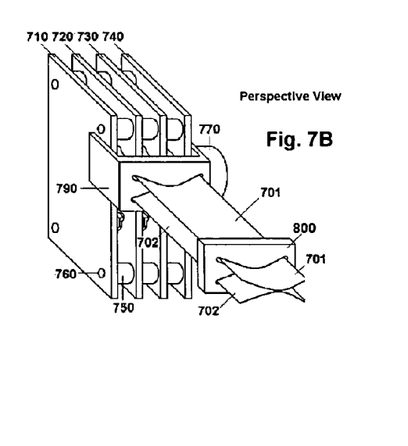
FIG 7B is a perspective view of the composite structure.

FIG. 7A and FIG. 7B show another embodiment of this invention. In the mechanism of FIG. 7 a plurality of tapes are simultaneously extended or retracted from the same spool by forces that act in the circumferential direction upon the interior ends of the tapes. The tapes are joined together outside the spooling structure to form a mechanically robust extending structure. FIG. 7A shows both a plan view of the interior of mechanism and FIG. 7B shows an overall perspective view. In FIG. 7A AND 7B two metal tapes, 701 and 702, are wound, overlapping each other, on a spool piece, 703. The tapes are rigidly fixed to each other and to the periphery of the spool piece using fasteners like small machine screws or a strong adhesive at 704 in the figure. The spool piece, 703, is fastened to an axle, 705, that is also connected to some mechanical means (e.g. a motor or hand crank) that can impart rotary motion to the spool piece. Clockwise motion of the spool, 703, that results in extension of the composite structure is illustrated by a circular arrow in the plan view of FIG. 7A. The support structure is composed of four plates (710, 720, 730, and 740 in FIG. 7B) of a low friction material such as UHMW polyethylene, fluorinated ethylene propylene (FEP), or polytetrafluoroethylene (PTFE). The plates are separated by spacers and held together with fasteners (e.g. machine screws and nuts) through the plates and the centers of the spacers. In FIG. 7A and FIG. 7B a typical spacer is shown at 750 and a typical fastener is shown at 760. All of the plates of the support structure are not the same. Plate 710 simply serves as a low friction retainer for the tapes to bear upon. Plate 740 serves the same purpose as plate 710 but also serves as a mounting plate for the mechanical means that effects the rotary spooling motion. In FIG. 7A and FIG. 7B the mechanical means is an electric motor, 770, mounted to plate 740 as shown in FIG. 7B. Plates 720 and 730 are identical and, in addition to being a part of the support structure, also serve as segmented versions of the low friction and compressible layers shown in FIG. 6C. The low friction layer is composed of rollers, 725, that rotate on axles, 726, supported in frame pieces, 727. The frame pieces in FIG. 7 are an integral part of the plates 720 and 730. The frame pieces are connected to the rest of the plates, 720 and 730, by narrow regions, 715, that act as springs and allow the frame pieces and rollers to move in order to accommodate the changing diameter of the coiled tapes, 701 and 702, as they wind or unwind on the spool piece, 703. The movement of the frame pieces, 727, and rollers, 725, in FIG. 7A is similar to the movement of the frame pieces, 427, and rollers, 425, in the detail view 2 of FIG. 6C; and this movement facilitates the tape motion. In many cases (e.g. small spooling structures and light external loading) the axles, 726, and rollers, 727, may be replaced by simple spacers that join plates 720 and 730 together at the frame pieces, 727. These frame pieces then contact the tape, 701, directly and, if they are made of a low friction material, may provide enough friction reduction to eliminate the need of a roller. The two tapes, 701 and 702, enter or exit the spooling structure though a slot, 780, in plates 720 and 730. If the tapes are of the curved cross section type typically used for measuring they have flat cross sections around the spool, 703, and naturally bend into the curved cross section shapes outside the spooling structure. The cross sectional curvature is shown clearly in the perspective view.

The support piece, 790, is attached to plates 710 and 740 and the composite extending structure (formed from tapes 701 and 702) passes through it. The support piece in FIG. 7A and FIG. 7B is made of a low friction material (e.g. UHMW polyethylene, fluorinated ethylene propylene (FEP), or polytetrafluoroethylene (PTFE)) that does not impede the passage of tapes 701 and 702. For the mechanism shown the cross section of the composite is bowtie shaped and is formed naturally from the curved cross section tapes as they extend through the support piece, 790. For more complex composite structures the support piece would also function as a forming mechanism for the cross section of the composite. For example if three tapes were used to form a composite structure whose cross section was triangular, then three tapes would be unwound from the spool, 703, and the support piece would be designed to twist two of the tapes by $60°$ around an axis parallel to the direction of extension so as to form so as to form a triangular cross section. The support piece would further be designed to dispense retaining parts on the extending composite so as to maintain the shape of the cross section. Mechanisms for forming the cross section of the extending composite structure and for dispensing retaining parts have already been discussed in regard to FIGS. 3, 4, and 5. The two tapes that form the composite structure in FIG. 7A and FIG. 7B are joined together at the end of the extension using a joining piece, 800. Because the tapes are rigidly joined at the point labeled 704 in FIG. 7A they cannot both be rigidly joined to the joining piece. Each turn of tape 701 on the spool, 703, is at a larger circumference than the corresponding turn of tape 702. For a given number of clockwise rotations of the spool, 703, the left end of tape 701 will move further than the left end of tape 702. Thus the joining piece is made of a low friction material, such as UHMW polyethylene, fluorinated ethylene propylene (FEP), or polytetrafluoroethylene (PTFE), that allows tape 701 to slide easily through it while tape 702 is rigidly attached to the joining piece using fasteners like small machine screws or a strong adhesive at 810 in FIG. 7A. Mechanical attachment of an external system to the composite structure may be accomplished by means of a rigid coupling of that system to the joining piece, 800.

Figure 8A:
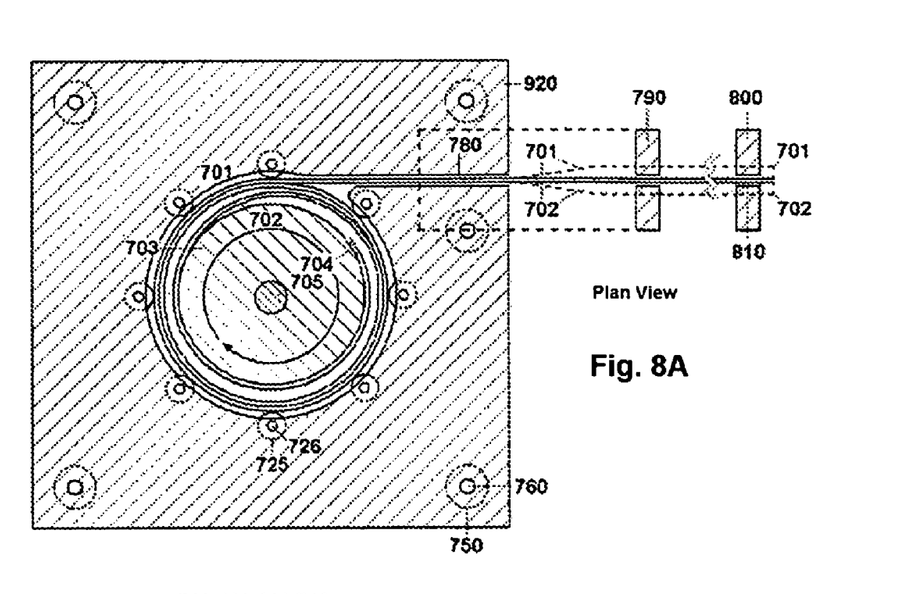
FIG. 8A shows a plan view of an additional two-tape embodiment of a composite structure according to the present invention using a single directly driven spooling structure.
Figure 8B:
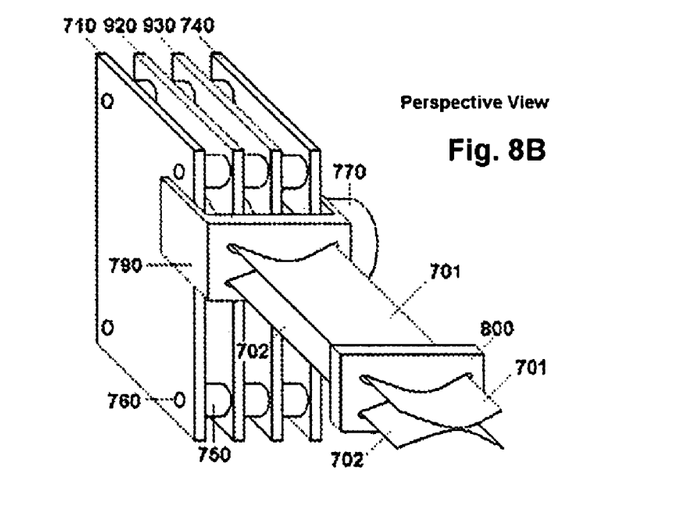
FIG. 8B is a perspective view of the composite structure.

The movement of the frame pieces, 727, and rollers, 725, in FIG. 7A facilitates tape motion. However, if the tapes are not excessively long and are not heavily loaded in the axial direction toward the spool, a rigid structure, as shown as a plan view in FIG. 8A and as a perspective view in FIG. 8B, works well. In FIGS 8A and 8B, rigid plates 920 and 930 replace the compliant plates 720 and 730 of FIG. 7A and FIG. 7B; all of the other components are identical and are indicated with identical identifiers.

The structures shown in FIGS. 7A, 7B, 8A, and 8B have two distinct advantages. First the tape motion is directly driven and does not rely on a friction mechanism (such as friction drive pulleys) to effect tape motion. Second, the fact that the tapes are wound on the same spool is a simplification; the number of spools and spool drives is reduced. Beyond that, the tapes emerge from the spooling mechanism very close to the centerline of the extension motion. Therefore, in forming the composite structure, the tapes do not have to be translated in a direction perpendicular to (i.e. bent towards) the centerline of the extension motion and the force available from the spooling drive is coupled straight along the length of the extended composite structure rather than through bends.

What is claimed is:

1. A structural extending member comprising:
   a support structure having a cavity adapted to support a coiled flexible tape, wherein said support structure comprises a first end plate, at least one interior plate, and a second end plate,
   a spool piece contained within the cavity of said support structure,
   a plurality of flexible tapes, each tape having a first end and a second end, wherein the first ends of said flexible tapes are attached to said spool piece,
   rotary mechanical means in mechanical communication with said spool piece, wherein said rotary mechanical means is selected from the group consisting of an electric motor mounted on said second end plate and a hand crank mechanism mounted on said second end plate,
   a joining piece adapted to maintain the second ends of said plurality of tapes in close proximity with each other.

2. The structural extending member of claim 1 wherein the cavity of said support structure has a low-friction interior surface.

3. The structural extending member of claim 2 wherein the cavity of said support structure has a compliant interior surface.

4. The structural extending member of claim 1 further comprising a plurality of rollers adapted to support a coiled flexible tape within the cavity of said support structure.

5. The structural extending member of claim 4 further comprising a plurality of frame pieces to which said plurality of rollers are attached, thereby providing compliant support for a coiled flexible tape.

6. The structural extending member of claim 1 in which said rotary mechanical means is an electric motor mounted on said second end plate.

7. The structural extending member of claim 1 in which said rotary mechanical means is a hand crank mechanism mounted on said second end plate.

8. The structural extending member of claim 1 further comprising a support piece attached to said support structure and adapted to guide and form said plurality of flexible tapes.

9. The structural extending member of claim 8 wherein said support structure is fabricated from a low-friction material.

10. The structural extending member of claim 9 wherein said low-friction material is UHMW polyethylene.

11. The structural extending member of claim 9 wherein said low-friction material is fluorinated ethylene propylene (FEP).

12. The structural extending member of claim 9 wherein said low-friction material is polytetrafluoroethylene (PTFE).

13. The structural extending member of claim 1 wherein the second end of a first tape of said plurality of tapes is rigidly attached to said joining piece and the second ends of the remainder of said plurality of tapes are held in close proximity to said first tape but free to move in a direction parallel to said first tape.

14. The structural extending member of claim 13 wherein said joining piece is made from a low-friction material.

15. The structural extending member of claim 14 wherein said low-friction material is UHMW polyethylene.

16. The structural extending member of claim 14 wherein said low-friction material is fluorinated ethylene propylene (FEP).

17. The structural extending member of claim 14 wherein said low-friction material is polytetrafluoroethylene (PTFE).

18. A structural extending member comprising:
a support structure having a cavity adapted to support a coiled flexible tape,
a spool piece contained within the cavity of said support structure,
a plurality of flexible tapes, each tape having a first end and a second end, wherein the first ends of said flexible tapes are attached to said spool piece,
rotary mechanical means in mechanical communication with said spool piece,
a joining piece adapted to maintain the second ends of said plurality of tapes in close proximity with each other, wherein the second end of a first tape of said plurality of tapes is rigidly attached to said joining piece and the second ends of the remainder of said plurality of tapes are held in close proximity to said first tape but free to move in a direction parallel to said first tape.

* * * * *